United States Patent
Tanner et al.

(10) Patent No.: US 10,445,717 B2
(45) Date of Patent: Oct. 15, 2019

(54) SYSTEM AND METHODS FOR ISSUANCE OF A MOBILE PAYMENT ACCOUNT

(71) Applicant: MasterCard International Incorporated, Purchase, NY (US)

(72) Inventors: Colin Tanner, Middlesex (GB); Christina E. Sheppard, Mamaroneck, NY (US); German Blanco, London (GB)

(73) Assignee: Mastercard International Incorporated, Purchase, NY (US)

( * ) Notice: Subject to any disclaimer, the term of this patent is extended or adjusted under 35 U.S.C. 154(b) by 802 days.

(21) Appl. No.: 14/050,474

(22) Filed: Oct. 10, 2013

(65) Prior Publication Data

US 2014/0101035 A1 Apr. 10, 2014

Related U.S. Application Data

(60) Provisional application No. 61/711,940, filed on Oct. 10, 2012.

(51) Int. Cl.
*G06Q 40/00* (2012.01)
*G06Q 20/32* (2012.01)
*G06Q 20/28* (2012.01)

(52) U.S. Cl.
CPC ........... *G06Q 20/322* (2013.01); *G06Q 20/28* (2013.01); *G06Q 20/3278* (2013.01)

(58) Field of Classification Search
CPC .................................................. G06Q 20/322
USPC ...................................................... 705/35–45
See application file for complete search history.

(56) References Cited

U.S. PATENT DOCUMENTS

| | | | |
|---|---|---|---|
| 7,881,965 B2 | 2/2011 | Bowles et al. | |
| 9,106,632 B2 * | 8/2015 | Musfeldt | H04L 9/3234 |
| 2011/0070877 A1 | 3/2011 | Macaluso | |
| 2012/0084210 A1 | 4/2012 | Farahmand | |
| 2012/0300932 A1 * | 11/2012 | Cambridge | H04L 9/3234 380/270 |
| 2013/0159154 A1 * | 6/2013 | Purves | G06Q 20/36 705/35 |

OTHER PUBLICATIONS

"PCT International Preliminary Report on Patentability and Written Opinion" dated Apr. 14, 2015 from International Application No. PCT/US2013/064236, 7 pp.

(Continued)

*Primary Examiner* — Chia-Yi Liu
(74) *Attorney, Agent, or Firm* — Buckley, Maschoff & Talwalkar LLC

(57) ABSTRACT

Methods and apparatus for provisioning a payment account on a mobile device at a location such as a retail store in conjunction with a purchase. A method includes a personalization server computer receiving payment account information of a consumer and a mobile payment account information request message from a merchant device, the message including information identifying the make and model of a mobile device being considered for purchase and a mobile network operator (MNO) identifier. The personalization server computer verifies the payment account information, determines a provisioning response message that includes information identifying at least one provisioning option, and transmits the provisioning response message to the merchant device for presentation to the consumer.

13 Claims, 4 Drawing Sheets

(56) References Cited

OTHER PUBLICATIONS

"Notification of Transmittal of the International Search Report and the Written Opinion of the International Searching Authority, or the Declaration", dated Mar. 4, 2014, for International Application No. PCT/US13/64236, 9pgs.

* cited by examiner

SYSTEM AND METHODS FOR ISSUANCE OF A MOBILE PAYMENT ACCOUNT

CROSS REFERENCE TO RELATED APPLICATION(S)

This application claims the benefit of U.S. Provisional Patent Application No. 61/711,940 filed on Oct. 10, 2012, the contents of which are hereby incorporated by reference for all purposes.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as "PayPass™", for interoperability of proximity payment cards and proximity readers. Other proximity payment schemes are also increasingly in use.

It has been proposed that the capabilities of a contactless payment card be incorporated into mobile devices, such as a mobile telephone, thereby turning the mobile device into a contactless payment device. One issue that is raised by this proposal is how to load the payment card account number and other account-specific or device-specific information into a mobile telephone; this process is referred to as "personalization". As a result of a multiplicity of form factors, mobile telephones cannot be readily subjected to the same type or kind of automated personalization process that contactless payment cards typically undergo. It also may present logistical problems to transport a mobile telephone to be configured as a contactless payment device to a personalization facility either after the user has purchased the phone, or before placing the phone in a typical mobile telephone distribution channel. It has therefore been proposed to personalize mobile telephones/contactless payment card devices while the devices are in the user's possession via "over the air" (OTA) data communication, which means by data communication via the mobile telephone network in which the phone operates.

However, many OTA personalization processes for mobile telephones/contactless payment devices can be time consuming and inconvenient for consumers. For example, in some situations, the OTA personalization process for certain payment applications can take over twenty (20) minutes to complete. Further, despite attempts to simplify the OTA personalization process, many consumers still find the process awkward and/or confusing. It thus would be desirable to provide a personalization process for mobile telephones/contactless payment devices that is quick, convenient and secure.

DETAILED DESCRIPTION

Figure 1:
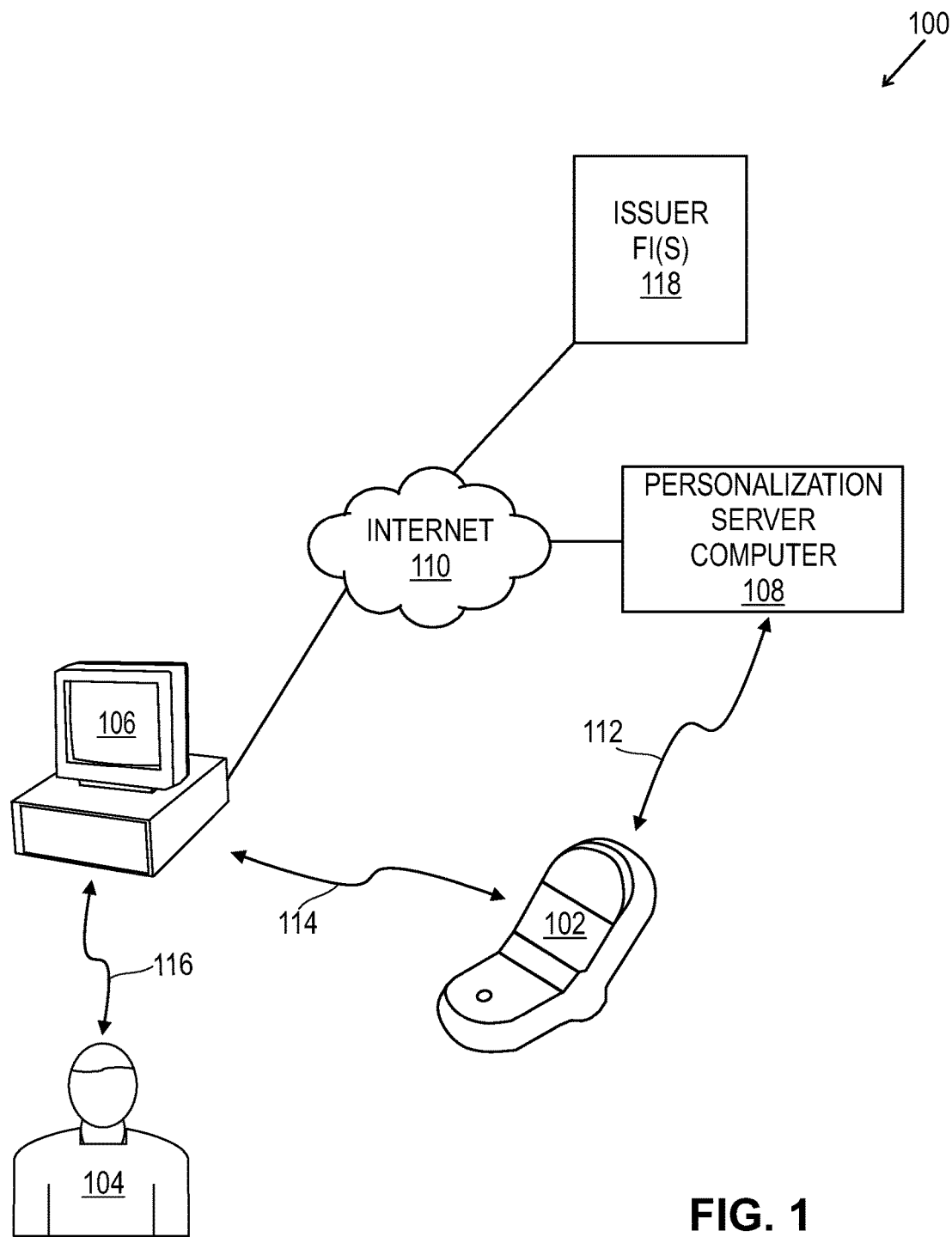
FIG. 1 is a schematic block diagram of a system that allows for personalization of a mobile telephone in accordance with the invention.

Pursuant to some embodiments of the present invention, a point of sale ("POS")—centric personalization process for provisioning a payment account on a mobile device, such as a mobile telephone, is provided. In some embodiments, systems and methods for provisioning a payment account on such mobile devices are provided which allow, for example, the mobile device to be provisioned at a retail store or point-of-sale in conjunction with a purchase of the mobile device. Examples of mobile devices that can be provisioned in accordance with embodiments described herein include, but are not limited to, mobile telephones, laptop computers, tablet computers (such as the Apple iPad®), personal digital assistance (PDA) devices, electronic watches, and portable game consoles (Such as the Sony PlayStation Vita® and/or the Nintendo 3D5® handheld portable console).

For example, in some embodiments, when a consumer purchases his or her NFC-enabled mobile telephone, the consumer may be offered the opportunity to have a payment account directly personalized and/or provisioned by the retailer. Pursuant to some embodiments, a connection (either wired or wireless) is made between a retail terminal (such as a point of sale (POS) terminal) or other merchant device and the mobile telephone, allowing the retail terminal to control the provisioning process. In particular, for example, a merchant's POS terminal can be configured to establish communications between the mobile telephone and an existing secure environment via a network connection. In this manner, consumers can avoid the complexity and time commitment involved to conduct a typical over-the-air (OTA) provisioning process themselves. In addition, retailers enjoy increased adoption of NFC payment accounts on mobile devices sold by the retailer or merchant because consumers recognize that the merchant will help them to successfully conduct an appropriate provisioning process for the mobile device that the consumer is purchasing.

In some embodiments, retailers may be able to offer consumers a variety of different personalization or provisioning options that are appropriate to the specific brand and/or model of mobile device the consumer is purchasing. For example, a retailer selling Samsung cell phones running the Android™ mobile operating system can provide one or more suitable personalization options and help consumers select and run an appropriate personalization process to achieve the consumer's selection. The same can be true for other retailers selling Apple® products, such as iPhones® and iPads® that are running, for example, the iOS 7™ mobile operating system. The same can also be true for retailers or merchants offering Nokia® cell phones for sale that run the Microsoft Mobile® operating system. Moreover, in some embodiments, retailers or merchants (or other mobile device providers) may offer such setup or provisioning services for a fee, which many consumers would pay to avoid enduring a personalization and/or provisioning process on their own, and to ensure that the mobile device being purchased will undergo a suitable provisioning process.

FIG. 1 is a schematic block diagram of a system 100 according to an embodiment that allows for retail store or point-of-sale provisioning of NFC payment accounts on a mobile device such as a mobile telephone 102. A store clerk 104 at a retail location interacts with consumers and offers to sell a mobile device, such as a mobile telephone 102 to an end user or consumer (not shown). The store clerk 104 interacts with a retail terminal 106 (such as a point-of-sale (POS) terminal or other merchant device), and a remote personalization server computer 108 operates to manage the personalization process. A communication network 110 (such as the Internet, or a computer network, or secure communications network, and the like) is utilized to exchange data communication between the retail terminal 106 and the personalization server computer 108. Such a network may also be utilized to exchange data between the retail terminal 106 and one or more issuer financial institutions (FIs) 118. It will also be understood that, in some situations, some communications with the mobile telephone 102 may occur via a mobile network (not explicitly shown in FIG. 1) operated by a mobile network operator (MNO) during the personalization process. Thus, an over-the-air (OTA) communication channel 112 between the personalization server computer 108 and the mobile telephone 102 is also indicated, which may be established via such a mobile network. In particular, Operator Proprietary Messaging, SMS messaging and/or conventional client/server data communications may take place between the personalization server computer 108 and the mobile telephone 102 via the communication channel 112.

Interaction between the retail terminal 106 and the mobile telephone 102 is schematically indicated at 114, and this may be a wired or wireless communication channel. For example, the mobile telephone 102 may be placed in direct communication with the retail terminal 106 using a USB cable or similar wired interface, or via a wireless network communication interface (such as WiFi, Bluetooth, or the like). Interaction between the retail clerk 104 and the retail terminal 106 is schematically indicated at 116, and may be carried out using any type of input device such as a keyboard, a mouse, a touch screen, a microphone (for audio input) or by any other data entry means and/or techniques.

The retail terminal 106 may also be provisioned with a contactless card reader and/or other reader devices (not shown) such as a contact-type reader. The contactless card reader may allow NFC communications with a mobile device such as the mobile telephone 102, as well as NFC communication with one or more contactless payment devices which may be used, for example by the clerk 104, during the personalization process. As mentioned above, the retail terminal 106 may also be provisioned with one or more contact-type readers, such as an EMV card reader, a traditional magnetic stripe card reader, an ISO/IEC 7816 contact card reader, an ISO/IEC 14443 contactless card reader, and/or a biometric reader, a barcode reader, a product label reader, and the like.

The personalization server computer 108 may, in some cases, be operated by or on behalf of a bank or other financial institution that issued a payment card account (an issuer financial institution (FI)) to a consumer. Alternatively, the personalization computer server 108 may be owned and/or operated by a third party, such as a service provider, to which a number of different financial institutions may subcontract mobile telephone personalization services. For example, a suitable service provider may be a payment card association, such as MasterCard International Incorporated. The personalization server 108 may be configured to operate as described in our co-pending and commonly-assigned U.S. patent application Ser. No. 13/268,155, filed on Oct. 7, 2011 (the contents of which are hereby incorporated by reference in their entirety for all purposes).

Figure 2:
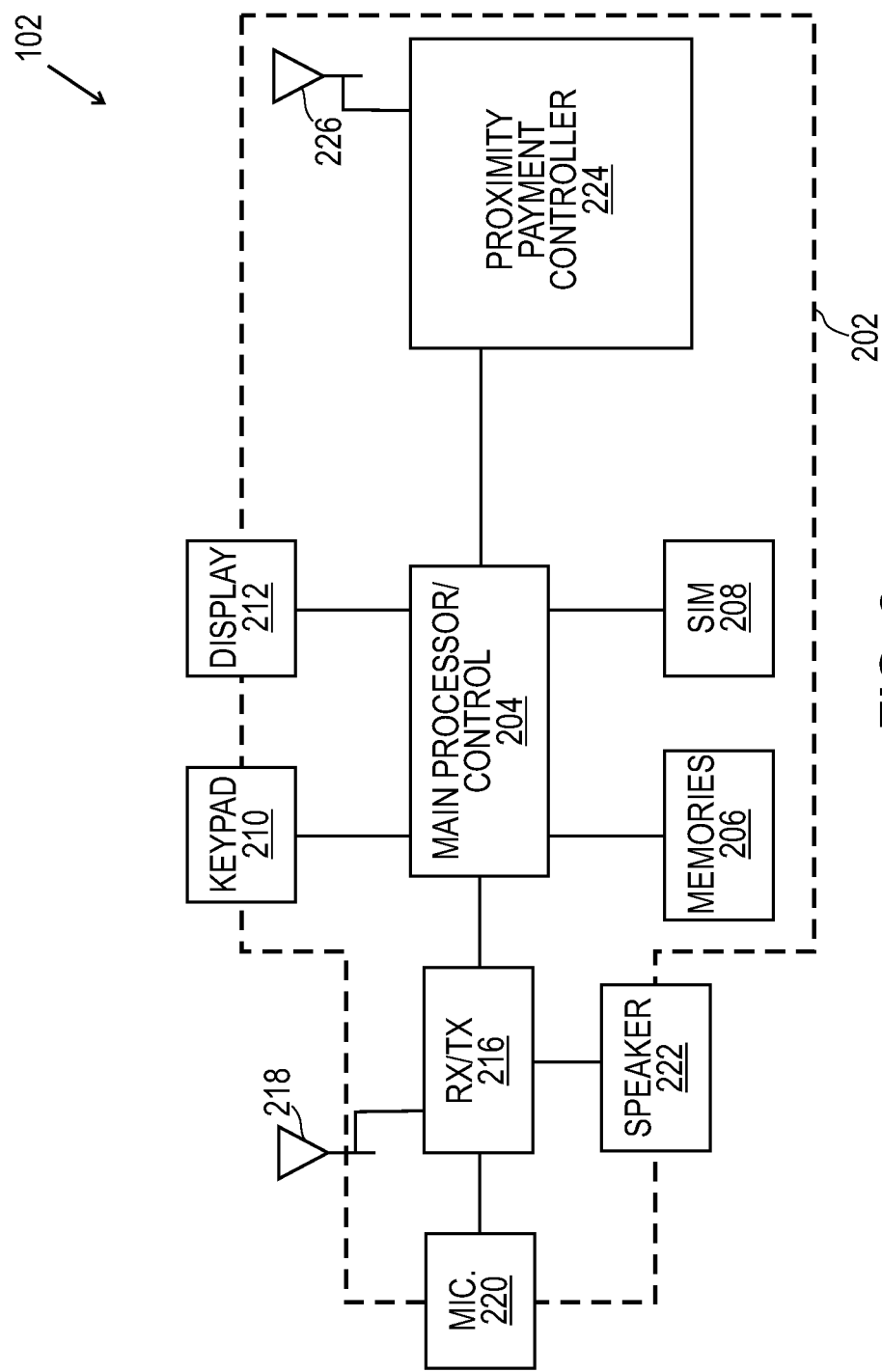
FIG. 2 is a schematic block diagram of the mobile telephone shown in FIG. 1.

FIG. 2 is a block diagram of an example of the mobile telephone 102 shown in FIG. 1. In its hardware aspects the mobile telephone 102 may be entirely conventional, and indeed in most of its software aspects it also may be conventional, and may be configured to provide novel functionality as described herein through interaction (for example, via interaction via communications channel 114 of FIG. 1) with the personalization server 108 and/or through interaction (for example, via communications channel 114) with the merchant device 106. In other embodiments, however, novel functionality as described herein may result at least partially from software and/or firmware that programs the mobile telephone 102 as well as software and/or firmware that programs the merchant's retail terminal 106.

The mobile telephone 102 may include a conventional housing (indicated by dashed line 202) that contains and/or supports the other components of the mobile telephone 102. The mobile telephone 102 may further include conventional control circuitry 204, for controlling over-all operation of the mobile telephone 102. Preferably the control circuitry 204 is suitably programmed to allow the mobile telephone 102 to engage in data communications and/or text messaging with other devices, and to allow for interaction with web pages accessed via Internet browser software, which is not separately shown. Other components of the mobile telephone 102, which are in communication with and/or controlled by the control circuitry 204, include: (a) one or more memory devices 206 (for example, program and working memory or a non-volatile computer storage device storing instructions and/or data, and the like); (b) a conventional SIM (subscriber identification module) card 208; (c) a conventional keypad 210 (or touch screen) for receiving user input; and (d) a display 212 (which may be a touch screen) for displaying output information to the user.

The mobile telephone 102 also includes conventional receive/transmit circuitry 216 that is also in communication with and/or controlled by the control circuitry 204. The receive/transmit circuitry 216 is coupled to an antenna 218 and is operable to access the communication channel(s) by which the mobile telephone 102 communicates via the mobile network (not shown). The mobile telephone 102 further includes a conventional microphone 220, coupled to the receive/transmit circuitry 216. Of course, the microphone 220 is for receiving voice input from the user. In addition, a loudspeaker 222 is included to provide sound output to the user, and is coupled to the receive/transmit circuitry 216.

The mobile telephone 102 may also include an integrated circuit (IC) or chipset 224 of the kind embedded in contactless payment cards. For example, the IC 224 is connected to an antenna 226 and (once the mobile telephone 102 has been personalized, as described below) operates so as to interact with an RFID reader and/or a NFC proximity reader that may be associated with a merchant's POS terminal, for example, to provide a payment card account number for a purchase transaction at the POS terminal. For example, the IC 224 may be designed or configured and/or programmed to operate in accordance with the above-mentioned Pay-Pass™ standard.

Pursuant to some embodiments, a retail personalization process pursuant to the present invention may be initiated by the retail clerk 104 interacting with the retail terminal 106 and a customer who has just purchased (or is in the process of purchasing) a mobile telephone 102 or another type of mobile device configured for wired and/or wireless communications. A retail personalization process may be initiated at the request of the customer or at the prompting of the retail clerk (for example, as an offer or enticement by the clerk to the customer associated with the sale of the mobile device). For example, the retail clerk may ask the customer if they would like a MasterCard® payment account (or other payment card account brand) provisioned onto the customer's new mobile telephone 102 so that it can be used in future to conduct purchase transactions. If the customer agrees, the retail clerk may ask the customer which payment cards they hold, and have the customer select one that he or she wishes to associate with a mobile payment account to be provisioned onto the mobile device. Once the customer determines which payment card they would like provisioned onto their mobile telephone, the customer is prompted to swipe (in the case of a magnetic stripe payment card), or dip (in the case of an EMV payment card), or tap (in the case of an NFC card such as a PayPass™ card) their payment card at a card reader (not shown) associated with the retail terminal 106 so that the provisioning process can be initiated.

In some embodiments, payment card information, including the primary account number ("PAN") is read by the card reader from the payment card, and is routed in a mobile payment account information request message from the retail terminal 106 to a remote verification entity (which, in some embodiments may be the personalization server computer 108 of FIG. 1, which may be operated by the issuer FI; but the verification entity may also be a different party). In some embodiments, the mobile payment account information request message from the retail terminal 106 also includes information identifying the brand and/or type and/or make and/or model of the mobile device (such as mobile telephone 102) being purchased at the retail terminal 106 (which information may be represented as a stock keeping unit (SKU) or other product code). For example, the store clerk may scan a barcode label (or other identification label) using a product label reader device (or other type of reader device) associated with the retail terminal that operates to read such mobile device identification information. In an implementation, the personalization server computer 108 receives the mobile payment account information request message and the consumer's payment account information (which may include the PAN) and then performs a database lookup of a mobile device provisioning database to determine whether (and how) the payment card selected by the customer can be provisioned onto the mobile telephone 102. Such a mobile device provisioning database may include entries listing the issuer financial institutions (FIs) participating in the mobile device provisioning service, rules and/or requirements and/or restrictions specified by those issuer FIs that must be followed when provisioning a mobile device, entries listing the mobile network operators (MNOs) participating in the mobile device provisioning service, and/or a list of mobile devices that can be provisioned according to embodiments described herein. Thus, in some situations, one or more of three different provisioning scenarios may be appropriate based on: (1) the financial institution that issued the payment card account (identified by the bank identification number (BIN) included within the PAN), (2) the make and model of the mobile device, such as the mobile telephone 102, and (3) the mobile network operator (MNO) providing mobile communications services for that mobile device (where some mobile network operators may support only certain types of provisioning scenarios, or may support mobile payments only on certain model cell phones, for example, and/or may have different criteria for different scenarios).

Thus, depending on the issuer FI and the make and model of the mobile telephone, a provisioning response message may transmitted by the personalization server computer 108 and received at the retail terminal 106 that includes one or more mobile device provisioning options. For example, the provisioning response message may include information recommending one or more of the three following provisioning scenarios: (1) directly provisioning the customer's existing payment card account directly onto the mobile telephone 102 (in the case that there is a suitable secure element, such as in a SIM card or secure memory of the telephone, and the issuer of the payment card has an existing relationship with the MNO associated with the mobile telephone), (2) a mobile "staging" account may be provisioned onto the mobile telephone, where the mobile staging account is linked to the customer's existing payment account (such "staging" accounts are described in further detail in our co-pending and commonly assigned U.S. Provisional Patent Application Ser. No 61/711,922, filed on even date herewith), or (3) a new General Purpose Reloadable ("GPR") prepaid account may be provisioned onto the mobile telephone 102 if neither of option (1) or (2) is available. In general, by providing one or more of these options, based on a verification of the BIN (derived from the PAN) and based on the mobile device make and model, it is contemplated that more consumers will be able to quickly and easily provision payment card functionality onto their NFC-enabled mobile devices, such as mobile telephones.

In some embodiments, the merchant's POS device 106, in communication with the personalization server computer 108, will allow the store clerk 104 and/or the customer to check which options are available to the consumer. For example, mobile device provisioning options may be provided to the consumer on a display screen of the merchant device (such as a display screen of a POS terminal), and/or may be emailed to an email account of the consumer. The mobile device provisioning options may depend on a given payment card account and/or issuer FI, the type of mobile device (for example, a mobile telephone or tablet computer that functions using a particular operating system), and a given mobile network operator (MNO) (which MNO may have their own requirements, restrictions and/or limitations associated with the mobile provisioning service). In some implementations, selection of a best mobile device provisioning option by the consumer can be made with the help of the store clerk before the mobile device is actually purchased and while the customer is still in the merchant's store location. If none of the options presented to the consumer are satisfactory, then the store clerk may be in a position to recommend alternate mobile devices, such as a different type of cell phone or possibly even a tablet device, which may be associated with a different operating system and/or different MNO, or recommend use of a different payment card account with a particular mobile device.

Once the consumer selects a particular payment option (for example, a credit card account) and he or she agrees to purchase the package (which includes the mobile device and the payment card account feature), then provisioning of the payment account onto the mobile device can be initialized and performed. But before the mobile device is so provisioned, the consumer must submit to a normal eligibility check process which involves the consumer's issuer FI and can be conducted while the consumer is still in the merchant's store location. For example, once a response is received identifying which of the provisioning options are available to a given customer, the retail clerk may ask the consumer if he or she wishes to proceed with the purchase of the selected mobile device and one of the options concerning provisioning of the payment account. The retail clerk may also be prompted, for example, by a message transmitted to a display screen of the merchant device 106 to gather know-your-customer ("KYC") information from the consumer. Certain KYC information may be required from the consumer, for example, by credit card associations or due to governmental regulations. The retail clerk may then transmit the required information to an issuer FI computer 118, which issuer FI is identified by use of the PAN supplied by the consumer. In addition, in some situations, the customer may be required to speak on the phone with a representative of the consumer's issuer financial institution, or to login to his or her financial account via the Internet, to perform certain customer identity validation steps.

Once the consumer is authorized to use his or her payment account with a mobile device by the issuer FI, which means that the consumer's financial account is validated, the retail clerk 104 interacts with the retail terminal 106 to start the provisioning process. In some embodiments, during the provisioning process communications between the retail terminal 106, the mobile telephone 102 and the remote personalization server computer 108 occurs to securely load the appropriate contactless payment application into a memory of the mobile telephone 102. In some embodiments, because the communication between the retail terminal 106 and the mobile telephone 102 is via a wired or wireless communication channel, the appropriate contactless payment application may be loaded and provisioned quickly, sometimes in less than one minute. For example, in some embodiments, the store clerk transmits a mobile device provisioning request from the merchant device to the personalization server computer 108 that includes the consumer's selection of a provisioning option. The personalization server computer 108 then transmits the contactless payment application to the merchant device, and then the merchant device transmits the contactless payment application to the mobile device. However, in some other implementations the personalization server computer instead wirelessly transmits the mobile payment account application directly to the mobile device for loading thereon. The contactless payment application, when running on the mobile device, permits the consumer to perform near-field communication (NFC) purchase transactions with his or her mobile device.

If the provisioning that was selected is for a prepaid financial account, the process may further include prompting the customer to load an initial amount of funds into the prepaid account. This may be accomplished via a request transmitted to the merchant's POS terminal 106 or via transmission of a message to a display screen of the mobile device 102 and presented to the consumer. In some embodiments, the consumer may then present an amount of money to the store clerk to load associate with the prepaid account for the NFC-enabled mobile device. In other implementations, the consumer may pay in another manner, for example, by swiping his or her credit card on a magnetic-stripe reader associated with the POS terminal for a selected amount of money to fund the prepaid account on the NFC-enabled mobile device.

Whichever type of account provisioning is selected, the provisioning is controlled by interaction of the retail clerk with the retail terminal 106 while the retail terminal 106 is in communication with the mobile telephone 102. For example, the store clerk may interact with retail terminal 106 and request personalization via the terminal 106. In particular, in an embodiment the clerk may operate the terminal 106 to access a website maintained by the personalization server computer 108 and may enter, via an input device associated with the merchant device 106, information identifying the customer's payment card account number and the mobile telephone number assigned to the mobile telephone 102. In addition, the store clerk may enter consumer identifying data (such as the customer's name and address), security information (such as a consumer personal identification number (PIN) and/or a card security code typically printed on the back of the consumer's payment card) and/or other information requested by the personalization server computer 108 as part of the provisioning process. As described above, once the requested information is received and verified, the personalization server computer 108 may cause a contactless payment application to be downloaded and installed onto the mobile device 102. Upon completion of the loading of the contactless payment application and any user/device-specific information, the store clerk (and/or the customer) may interact with prompts on a display of the mobile telephone 102 to complete the application installation process, which may include entering certain requested data, to enable use of the mobile contactless payment application by the customer.

As mentioned above, once the payment account is provisioned onto the mobile device, the customer may be given an option to perform an initial funds load of the payment account so that the account is ready for use when the customer leaves the retail store. The customer may also be able to establish an on-going funding account so that the customer can easily undertake future reloads of the mobile payment account (wherein, in some implementations, the future reloads may also be automated for convenience).

Figure 3:
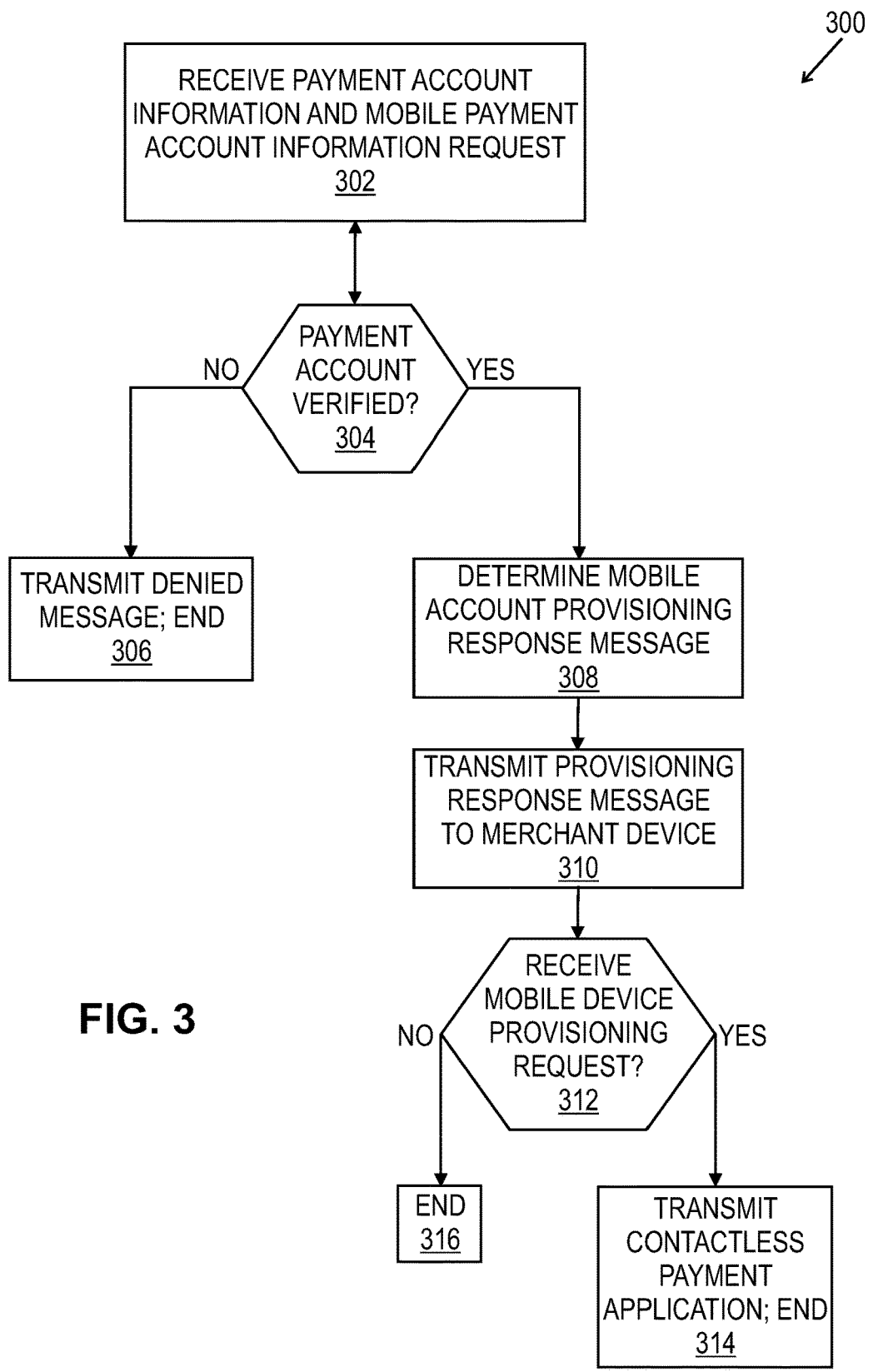
FIG. 3 is a flowchart illustrating a mobile device provisioning process according to an embodiment of the invention.

FIG. 3 is a flowchart illustrating a mobile device provisioning process 300 according to an embodiment. A personalization server computer receives 302 payment account information of a consumer and a mobile payment account information request message from a merchant device. The consumer's payment account information may include, for example, a PAN that identifies the consumer's issuer FI, and the mobile payment account information request message may include information identifying the make and model of a mobile device being considered for purchase by the consumer, along with a mobile network operator (MNO) identifier. The personalization server computer then verifies 304 the consumer's payment account information, which may be accomplished by performing a lookup in an issuer FI database to see if there is a match between the consumer's PAN and a range of PANs provided by issuer FIs that are participating in the mobile provisioning service. If the consumer's payment account information cannot be verified, then the personalization server computer transmits 306 a mobile account denied message to the merchant device for presentation to the consumer, and the process ends. But if the personalization server computer verifies the consumer's payment account information in step 304, then based on the information contained in the mobile payment account information request message, the personalization server computer determines 308 a mobile account provisioning response message. The provisioning response message includes information identifying at least one provisioning option for the mobile device. The personalization server computer then transmits 308 the provisioning response message to the merchant device for presentation to the consumer. The personalization server computer may determine the provisioning options to include in the provisioning response message by searching one or more databases of mobile device types, issuer FIs, MNOs, and business rules, and then assembling the mobile device payment account options into a message for presentation to the consumer.

Referring again to FIG. 3, if the personalization server computer receives 312 a provision request from the merchant device, then the personalization server computer transmits 314 a contactless payment application to the merchant device (or in some embodiments, transmits a contactless payment application directly to the consumer's mobile device) and the process ends. However, if the personalization server computer receives 312 does not receive a provision request from the merchant device (for example, because a predetermined time-out period expires, or because a mobile payment account denied message was received), then the process ends 316.

Figure 4:
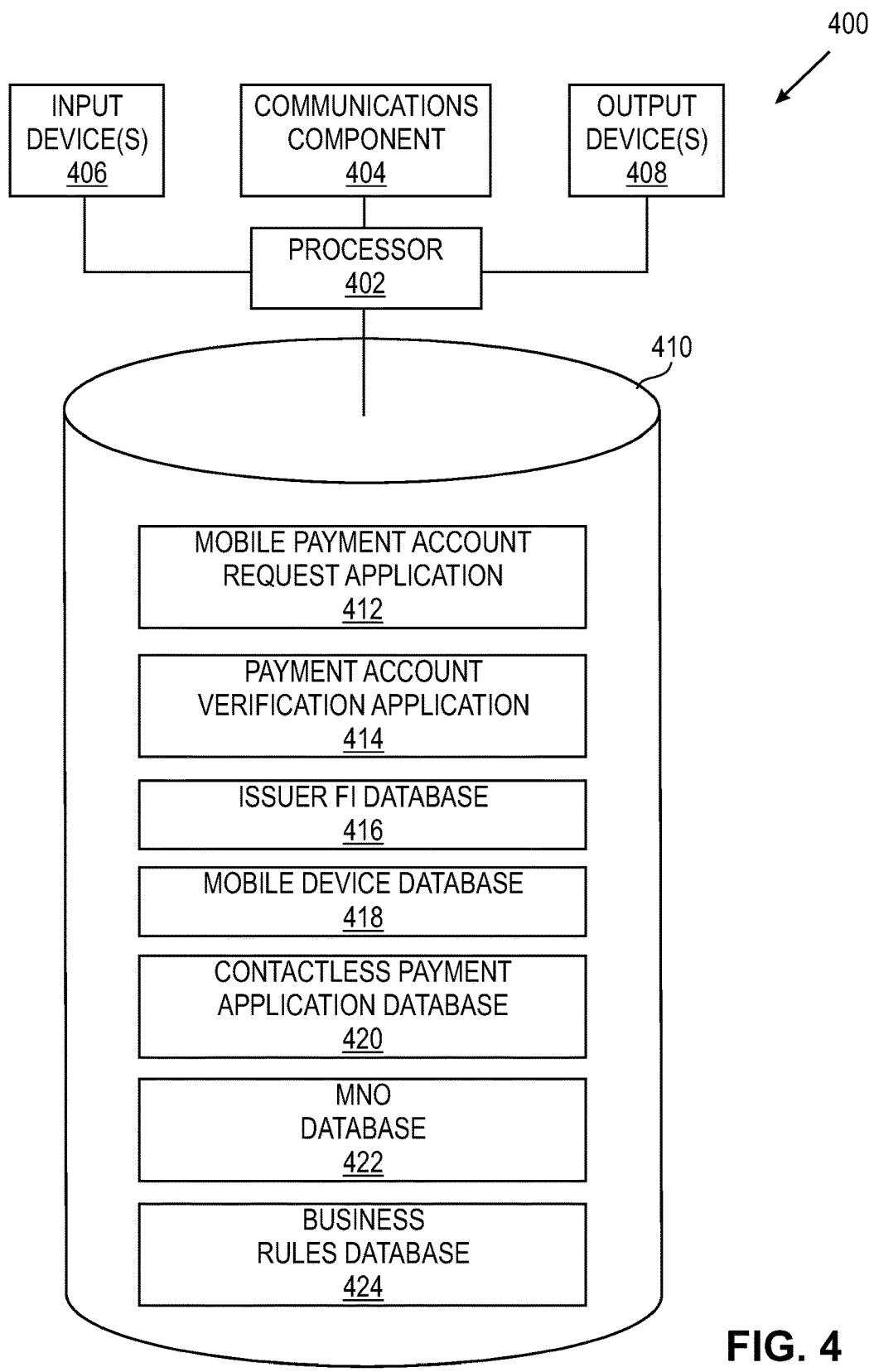
FIG. 4 is a block diagram of an embodiment of a personalization server computer according to an embodiment of the invention.

FIG. 4 is a block diagram of an embodiment of a personalization server computer 400 according to some embodiments. The personalization server computer may be conventional in its hardware aspects but may be controlled by software to cause it to operate in accordance with aspects of the methods presented herein. In particular, the personalization server computer 400 may include a computer processor 402 operatively coupled to a communication component 404, input device(s) 406, output device(s) 408, and a storage device 410.

The computer processor 402 may constitute one or more conventional processors. Processor 402 operates to execute processor-executable steps, contained in program instructions described herein, so as to control the personalization server computer 400 to provide desired functionality.

Communication component 404 may be used to facilitate communication with, for example, other devices. Communication device 404 may also, for example, have capabilities for engaging in data communications over conventional computer-to-computer data networks, and/or for wireless communications, for example, via a MNO with a wireless mobile device. Such data communications may be in digital form and/or in analog form.

Input device 406 may comprise one or more of any type of peripheral device typically used to input data into a computer. For example, the input device 406 may include a keyboard and a mouse and/or a touchpad that may be used, for example, by a systems engineer or other personnel authorized to, for example, perform personalization server computer system maintenance, updates or other tasks. The output device 408 may comprise, for example, a display and/or a printer.

Storage device 410 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory devices. Any one or more of the listed storage devices may be referred to as a "memory", "storage", a "storage medium" or a "computer-readable medium".

The non-transitory storage device 410, also known as a non-transitory computer-readable medium, stores one or more programs for controlling processor 402. The programs comprise program instructions that contain processor-executable process steps of the personalization server computer 400, including, in some cases, process steps that constitute processes provided in accordance with principles of the processes presented herein.

The programs may include a mobile payment account request application 412 that manages mobile payment account information requests received from merchant devices (such as POS terminals) concerning requests for consumer mobile payment account options for particular types of mobile devices. In some embodiments, the mobile payment account request process includes receiving information obtained from the consumer (a financial account holder) during purchase of a mobile device, which may include the consumer's name, a primary payment card account number (PAN), and a mobile telephone number (or other mobile device identifier), and the make and model of the mobile device. This information is then used to determining at least one mobile account provisioning option for the consumer, and to transmit a provisioning response message to the merchant device including the provisioning option(s) for presentation to the consumer. A payment account verification application 414 may also be included in some implementations, which is used to verify the consumer's payment account information provided by the merchant device before determining the consumer's mobile device provisioning options.

The application programs of the personalization server computer 400, as described above, may be combined in some embodiments, as convenient, into one, two or more application programs. Moreover, the storage device 410 may store other programs or applications, such as one or more operating systems, device drivers, database management software, web hosting software, and the like.

In addition, the storage device 410 may include one or more databases that are maintained by the personalization server computer on the storage device 410. In particular, pursuant to some embodiments, the personalization and/or provisioning processes described herein may be performed using a number of different databases, allowing accounts to be provisioned on a wide range of different mobile devices, integrated circuit cards, mobile network operators (MNOs), and financial institutions (FIs). For example, the databases may be consulted to determine an appropriate personalization approach and/or options to be presented to the consumer. Referring to FIG. 4, databases may include an issuer FI database 416, a mobile device database 418, a contactless payment application database 420, a mobile network operator database 422, and a business rule database 424. The issuer FI database 416 may identify a number of different issuer financial institutions that participate in (or have signed up to participate in) the mobile device payment account provisioning program, as well as information identifying different payment products associated with each financial institution that are eligible for use in conjunction with a mobile payment account pursuant to embodiments described herein. The issuer FI database 416 may also include, for each issuer FI and product, a primary account number range of payment accounts that may be provisioned, as well as the different personalization options allowed for each issuer FI and product combination, and account number range (e.g., such as whether a direct personalization of the present invention is permitted or not). The issuer FI database may also identify the type or level of "know your customer" (or "KYC") required (such as whether the consumer must present a passport, drivers license, utility bill and/or other evidence of identity before an account is provisioned), as well as any fees associated with the personalization.

The mobile device database 418 may identify a number of different mobile device makes and models, as well as information identifying whether the mobile device is capable of use as an NFC device as well as information identifying the operating system and other attributes of each device.

The contactless payment application database 420 may contain a number of different contactless application programs for provisioning a number of different types of mobile devices. For example, the contactless application programs may be written to function with different operating systems that run on, for example, Android-type devices and/or Apple-type devices.

The mobile network operator (MNO) database 422 may include information identifying a number of different mobile network operators participating in the mobile device personalization and/or provisioning program as well as information identifying the Universal Integrated Circuit Card ("UICC") versions supported by each mobile network operator (e.g., such as 16K, 32K, specific UICCs, and the like). The MNO database 422 may also include, for each UICC version and each network operator, information identifying whether that UICC version supports NFC, as well as any setup and/or monthly fees charged by the mobile network operator for provisioning and using a mobile device payment account.

A business rules database 424 may include data identifying, for each account, a set of specific mobile devices, UICCs and fees (including setup and/or monthly fees). In this manner, retail terminals may interact with a personalization server to identify a type of personalization to be used to personalize a payment account on any of a wide variety of different mobile devices, on a wide variety of different mobile networks, and with a wide variety of different issuers and financial products.

Embodiments of the processes described herein provide a number of advantages over other personalization and/or mobile device provisioning approaches. For example, embodiments help financial institutions (or other issuers) to reach open market mobile phones that are outside typical mobile network distribution channels. Further, mobile network operators and/or device manufacturers can eliminate or reduce the need for the management and contracting of hundreds of distribution and business agreements, as well as reduce the number of secure elements and keys to be controlled. In addition, providing such services may be particularly advantageous for wireless communication mobile devices that do not communicate over the air easily, or where provisioning processes could result in a substantial or significant cost for users (for example, if a particular type of mobile device does not come with a data contract). In addition, some consumers who do not have a long standing financial history may not be able to pass KYC checks, for example, and for those consumers, a face-to-face examination of their documents by a store clerk or other personnel may be the only way that they can purchase a mobile device and have it provisioned for mobile payments. In addition, elderly consumers, who may be averse to new technology or otherwise disinclined to try a mobile device provisioning process on their own may find it comforting (or at least satisfactory) to have a sales clerk in a retail store take care of everything for them. Moreover, retailers may enjoy the ability to provision NFC-enabled mobile devices and promote the use of NFC functionality in their store locations, and all participants enjoy reduced technological complexity and reduced cost when compared to conventional types of OTA provisioning. In some markets, retailers may be able to advertise and/or sell the NFC services to consumers and/or to issuer FIs and/or to MNOs and thus receive revenue from the setup and/or provisioning services that they provide. Yet further, as the mobile device market transitions to offer mobile device services to less financially sound customers (for example, consumers in third world countries) via prepaid accounts, one or more of the mobile device provisioning processes described herein involving prepaid mobile accounts could serve that market well.

As the term "payment transaction" is used herein and in the appended claims, it should be understood to include the types of transactions commonly referred to as "purchase transactions" in connection with payment card accounts and payment card systems.

As used herein and in the appended claims, the term "initiating a transaction" includes a proximity payment device such as a payment-enabled mobile telephone communicating with a reader device that may be associated with a merchant device such as a point-of-sale (POS) terminal. The term "initiating a transaction" can also include a payment-enabled mobile device communicating with a website, via the Internet or via another type of network connection, to transmit and receive data so as to enter into on-line payment transactions.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for provisioning a consumer mobile device comprising:

receiving, by a personalization server computer from a merchant device, payment account information of a consumer and a mobile payment account information request message, wherein the mobile payment account information request message comprises information identifying a make and model of a mobile device purchased by the consumer and a mobile network operator (MNO) identifier;

determining, by the personalization server computer based on at least a portion of the payment account information, an issuer financial institution (FI) holding a payment account of the consumer;

transmitting, by the personalization server computer to the issuer FI, a verification request comprising the payment account information;

receiving, by the personalization server computer from the issuer FI, a positive verification response that indicates participation by the issuer FI in a mobile provisioning service;

identifying, by the personalization server computer based on the payment account information and the MNO identifier, mobile device provisioning option information by searching in at least two of an issuer FI database, a mobile device type database, a contactless payment application database, a MNO database, and a business rules database;

assembling, by the personalization server computer based on the mobile device provisioning option information, a provisioning response message comprising information identifying at least one provisioning option for the mobile device; and transmitting, by the personalization server computer to the merchant device, the assembled provisioning response message for presentation to the consumer.

2. The method of claim 1, further comprising:

receiving, by the personalization server computer from the merchant device, a mobile device provisioning request that includes a selection of a provisioning option; and transmitting, by the personalization server computer to the merchant device, a contactless payment application for performing near-field communication (NFC) purchase transactions for loading into the consumer's mobile device.

3. The method of claim 1, wherein the payment account information comprises a primary account number (PAN), the consumer's name and address information, and consumer security information.

4. The method of claim 1, wherein the information identifying the make and model of the mobile device comprises at least one of a stock keeping unit (SKU) and product code.

5. The method of claim 4, wherein assembling a provisioning response further comprises:

determining, by the personalization server computer based on at least one of the SKU and the product code, at least one mobile network operator (MNO) and at least one associated mobile plan option associated with the mobile device purchased by the consumer; and preparing, by the personalization server computer, the provisioning response message by accumulating information of each MNO having at least one mobile operation plan associated with the mobile device.

6. The method of claim 1, wherein the merchant device obtains the payment account information via an associated card reader, and obtains the information identifying the make and model of the mobile device via a product label reader device.

7. The method of claim 1, wherein the at least one provisioning option for the mobile device comprises one of provisioning an existing payment card account of the customer onto the mobile device, provisioning a mobile staging account onto the mobile device, or provisioning a General Purpose Reloadable (GPR) prepaid account onto the mobile device.

8. An apparatus for provisioning a consumer mobile device, comprising:

a communications device;

a personalization processor operably connected to the communications device; and a storage device operably connected to the personalization processor, wherein the storage device stores processor-executable instructions configured to cause the personalization processor to:

receive payment account information of a consumer and a mobile payment account information request message from a merchant device, wherein the mobile payment account information request message comprises information identifying a make and model of a mobile device purchased by the consumer and a mobile network operator (MNO) identifier;

determine, based on at least a portion of the payment account information, an issuer financial institution (FI) holding a payment account of the consumer;

transmit a verification request comprising the payment account information;

receive a positive verification response that indicates participation by the issuer FI in a mobile provisioning service;

identify, based on the payment account information and the MNO identifier, mobile device provisioning option information by searching in at least two of an issuer FI database, a mobile device type database, a contactless payment application database, a MNO database, and a business rules database;

assemble, based on the mobile device provisioning option information, a provisioning response message comprising information identifying at least one provisioning option for the mobile device; and transmit the assembled provisioning response message to the merchant device for presentation to the consumer.

9. The apparatus of claim 8, wherein the storage device stores further instructions processor-executable instructions configured to cause the processor to:

receive a mobile device provisioning request from the merchant device that includes a selection of a provisioning option; and transmit a contactless payment application for performing near-field communication (NFC) purchase transactions to the merchant device for loading into the consumer's mobile device.

10. A non-transitory computer-readable medium storing processor executable instructions configured to cause a personalization processor to:

receive payment account information of a consumer and a mobile payment account information request message from a merchant device, wherein the mobile payment account information request message comprises information identifying a make and model of a mobile device purchased by the consumer and a mobile network operator (MNO) identifier;

determine, based on at least a portion of the payment account information, an issuer financial institution (FI) holding a payment account of the consumer;

transmit a verification request comprising the payment account information;

receive a positive verification response that indicates participation by the issuer FI in a mobile provisioning service;

identify, based on the payment account information and the MNO identifier, mobile device provisioning option information by searching in at least two of an issuer FI database, a mobile device type database, a contactless payment application database, a MNO database, and a business rules database;

assemble, based on the mobile device provisioning option information, a provisioning response message comprising information identifying at least one provisioning option for the mobile device; and transmit the assembled provisioning response message to the merchant device for presentation to the consumer.

11. The non-transitory computer-readable medium of claim 10, further comprising processor-executable instructions configured to cause the processor to:
receive a mobile device provisioning request from the merchant device, the mobile device provisioning request including a selection of a provisioning option; and
transmit a contactless payment application to the merchant device for loading into the consumer's mobile device, the contactless payment application configured to permit the mobile device to perform near-field communication (NFC) purchase transactions.

12. The non-transitory computer-readable medium of claim 10, wherein the instructions for assembling a provisioning response message further comprise processor-executable instructions configured to cause the processor to:
determine at least one mobile network operator (MNO) and at least one associated mobile plan option associated with the mobile device purchased by the consumer; and
prepare the provisioning response message by accumulating information of each MNO having at least one mobile operation plan associated with the mobile device.

13. The non-transitory computer-readable medium of claim 12, wherein preparing the provisioning response message further comprises processor-executable instructions configured to cause the processor to prepare a provisioning response message comprising at least one of an existing payment card account of the customer, a mobile staging account, or a General Purpose Reloadable (GPR) prepaid account.

\* \* \* \* \*